(12) United States Patent
Xie et al.

(10) Patent No.: US 8,407,462 B2
(45) Date of Patent: Mar. 26, 2013

(54) METHOD, SYSTEM AND SERVER FOR IMPLEMENTING SECURITY ACCESS CONTROL BY ENFORCING SECURITY POLICIES

(75) Inventors: Yongfang Xie, Shenzhen (CN); Weijia Sun, Chengdu (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 117 days.

(21) Appl. No.: 13/051,142

(22) Filed: Mar. 18, 2011

(65) Prior Publication Data

US 2011/0179267 A1 Jul. 21, 2011

Related U.S. Application Data

(63) Continuation of application No. PCT/CN2009/072062, filed on Jun. 1, 2009.

(30) Foreign Application Priority Data

Sep. 19, 2008 (CN) .......................... 2008 1 0149348

(51) Int. Cl.
*H04L 12/66* (2006.01)
(52) U.S. Cl. ............ 713/153; 713/188; 707/952; 726/1; 726/2; 726/3; 726/12; 726/29; 370/401; 719/311
(58) Field of Classification Search .................. None
See application file for complete search history.

(56) References Cited

U.S. PATENT DOCUMENTS

| 2003/0041238 A1* | 2/2003 | French et al. ................. 713/153 |
| 2003/0131245 A1 | 7/2003 | Linderman |
| 2003/0187619 A1* | 10/2003 | Lee et al. ..................... 702/188 |
| 2004/0107360 A1 | 6/2004 | Herrmann et al. |
| 2004/0158735 A1 | 8/2004 | Roese |
| 2005/0204050 A1* | 9/2005 | Turley et al. .................. 709/229 |

(Continued)

FOREIGN PATENT DOCUMENTS

| CN | 1553638 A | 12/2004 |
| CN | 1753364 A | 3/2006 |

(Continued)

OTHER PUBLICATIONS

1st Office Action in corresponding European Patent Application No. 09813984.3 (Jan. 7, 2013).

(Continued)

*Primary Examiner* — Haresh N Patel
(74) *Attorney, Agent, or Firm* — Leydig, Voit & Mayer, Ltd.

(57) ABSTRACT

A method for implementing network security access control is provided, including: receiving and decrypting terminal identity information that is encrypted in a bi-directional encryption mode and forwarded by a switch, and authenticating the decrypted terminal identity information; returning an authentication result to the switch so that the switch controls access of a terminal to a network according to the authentication result; encrypting the decrypted terminal identity information in a solo-directional encryption mode and authenticating the encrypted terminal identity information; returning an authentication result to a security access control gateway so that the security access control gateway controls access of the terminal to network resources according to the authentication result; delivering a security policy to a security control module on the terminal so that the security control module controls the terminal according to the security policy. A server is provided, including a first authentication module and a second authentication module. A system for implementing network security access control is provided, including a server, a switch, a security access control gateway and a terminal.

8 Claims, 3 Drawing Sheets

U.S. PATENT DOCUMENTS

| | | | |
|---|---|---|---|
| 2006/0031936 A1* | 2/2006 | Nelson et al. | 726/23 |
| 2006/0085853 A1* | 4/2006 | Simpson | 726/22 |
| 2006/0090196 A1* | 4/2006 | van Bemmel et al. | 726/4 |
| 2006/0234678 A1* | 10/2006 | Juitt et al. | 455/411 |
| 2006/0236363 A1* | 10/2006 | Heard et al. | 726/1 |
| 2007/0011262 A1* | 1/2007 | Kitani et al. | 709/213 |
| 2007/0094716 A1* | 4/2007 | Farino et al. | 726/5 |
| 2007/0214352 A1* | 9/2007 | Convery et al. | 713/153 |
| 2008/0028077 A1* | 1/2008 | Kamata et al. | 709/227 |
| 2009/0271852 A1* | 10/2009 | Torres et al. | 726/6 |
| 2009/0307751 A1* | 12/2009 | Lin et al. | 726/3 |
| 2010/0005290 A1* | 1/2010 | Urien et al. | 713/155 |
| 2011/0004918 A1* | 1/2011 | Chow et al. | 726/3 |

FOREIGN PATENT DOCUMENTS

| | | |
|---|---|---|
| CN | 101022340 A | 8/2007 |
| CN | 101068183 A | 11/2007 |
| CN | 101069183 A | 11/2007 |
| CN | 101378358 A | 12/2010 |
| WO | 02/082730 A1 | 10/2002 |
| WO | WO 02/082730 A1 | 10/2002 |

OTHER PUBLICATIONS

International Search Report in corresponding PCT Application No. PCT/CN2009/072062 (Sep. 10, 2009), pp. 1-4.

Written Opinion of the International Searching Authority in corresponding PCT Application No. PCT/CN2009/072062 (Sep. 10, 2009), pp. 1-4.

Extended European Search Report in corresponding European Application No. 09813984.3 (Sep. 20, 2011), pp. 1-6.

* cited by examiner

METHOD, SYSTEM AND SERVER FOR IMPLEMENTING SECURITY ACCESS CONTROL BY ENFORCING SECURITY POLICIES

CROSS-REFERENCE TO RELATED APPLICATIONS

This application is a continuation of International Application No. PCT/CN2009/072062, filed on Jun. 1, 2009 which claims priority to Chinese Patent Application No. 200810149348.1, filed on Sep. 19, 2008, both of which are hereby incorporated by reference in their entireties.

FIELD OF THE TECHNOLOGY

The present invention relates to the field of computer and Internet, and more particularly to a method, a system and a sever for implementing security access control.

BACKGROUND OF THE INVENTION

Many factors pose potential risks to network security of enterprises, and seriously interfere with or even stop the normal business of the enterprises, for example, larger internal networks of the enterprises, more complex network structures, more internal terminals, the spread of viruses and Trojan horse in real networks, and the information leakage caused by the access of non-authorized personnel. As a result, the enterprises seek for appropriate network security solutions. In addition to deploying anti-virus and firewall systems, many enterprises implement access authentication and security check for the terminals by deploying a network access control system, so as to solve the security problem in the Intranet.

In the conventional art, in a network access control system, an 802.1x switch is deployed between terminals and the Intranet or Extranet, and security control software is installed in each of the terminals. The 802.1x switch controls the network access right of each terminal, and the security control software implements a security policy delivered by a server to monitor the operation of the terminals, so as to achieve the security access control of the terminals to the network and achieve the security of the Intranet.

During the implementation of the present invention, the inventor finds that the conventional art at least has the following problems: the 802.1x switch controls the network access right of a terminal by enabling or disabling the network access right of the terminal, and once the network access right of the terminal is enabled, the terminal can browse all information in the Intranet or Extranet without limitation. Therefore, the security access control in the conventional art cannot precisely control the network access right of the terminal.

SUMMARY OF THE INVENTION

The embodiments of the present invention provide a method, a system and a server for implementing security access control, which can precisely control a network access right of a terminal.

To solve the above technical problems, the method and system for implementing security access control according to the embodiments of the present invention are provided through the following technical solutions.

A method for implementing network security access control is provided, which includes:

receiving terminal identity information that is encrypted in a bi-directional encryption mode and forwarded by a switch;

decrypting the terminal identity information encrypted in the bi-directional encryption mode, and authenticating the decrypted terminal identity information;

returning an authentication result to the switch, so that the switch controls access of a terminal to a network according to the authentication result;

encrypting the decrypted terminal identity information in a solo-directional encryption mode;

authenticating the terminal identity information encrypted in the solo-directional encryption mode;

returning an authentication result to a security access control gateway, so that the security access control gateway controls access of the terminal to network resources according to the authentication result; and delivering a security policy to a security control module of the terminal, so that the security control module monitors the terminal according to the security policy.

A server is provided, which includes:

a first authentication module, configured to receive terminal identity information that is encrypted in a bi-directional encryption mode and forwarded by a switch, decrypt the terminal identity information encrypted in the bi-directional encryption mode and authenticate the decrypted terminal identity information, and return an authentication result to the switch so that the switch controls access of a terminal to a network according to the authentication result; and a second authentication module, configured to encrypt the terminal identity information decrypted by the first authentication module in a solo-directional encryption mode, authenticate the terminal identity information encrypted in the solo-directional encryption mode, return an authentication result to a security access control gateway so that the security access control gateway controls access of the terminal to network resources according to the authentication result, and deliver a security policy to a security control module on the terminal so that the security control module of the terminal monitors the terminal according to the security policy.

A system for implementing network security access control is provided, which includes a server, a switch, a security access control gateway, and a terminal, in which the terminal includes a sending module and a security control module, the sending module is configured to send terminal identity information encrypted in a bi-directional encryption mode to the switch;

the security control module is configured to receive a security policy delivered by the server and monitor the terminal according to the security policy;

the server is configured to receive the terminal identity information that is encrypted in the bi-directional encryption mode and forwarded by the switch, decrypt the terminal identity information encrypted in the bi-directional encryption mode and authenticate the decrypted terminal identity information, return an authentication result to the switch, encrypt the decrypted terminal identity information in a solo-directional encryption mode, authenticate the terminal identity information encrypted in the solo-directional encryption mode, return an authentication result to the security access control gateway, and deliver a security policy to the security control module of the terminal;

the switch is configured to forward the terminal identity information that is encrypted in the bi-directional encryption mode and sent by the terminal, to the server, receive the authentication result returned by the server, and control network access of the terminal according to the authentication result; and the security access control gateway is configured to receive the authentication result returned by the server and control access of the terminal to network resources according to the authentication result.

According to an embodiment of the present invention, after the terminal identity information encrypted in the solo-directional and bi-directional encryption modes is authenticated, an authentication result is returned, a switch controls network access of a terminal according to the authentication result, and a security access control gateway controls access of the terminal to network resources according to the returned authentication result; after the authentication, a security policy is sent to the terminal, so as to monitor the terminal. In the embodiments of the present invention, the security access control gateway controls the network access rights of each terminal, the delivered security policy is used to monitor the operation of the terminals, and the security access control gateway is added, so that more precise control over the network access right of the terminals is achieved. Therefore, the present invention solves the security problem of the Intranet more comprehensively.

BRIEF DESCRIPTION OF THE DRAWINGS

To make the technical solution of the present invention clearer, the accompanying drawings for illustrating the embodiments of the present invention or the prior art are outlined below. Apparently, the accompanying drawings are for the exemplary purpose only, and person having ordinary skill in the art can derive other drawings from such accompanying drawings without any creative effort.

DETAILED DESCRIPTION OF THE EMBODIMENTS

The technical solution under the present invention is elaborated below with reference to accompanying drawings. Evidently, the embodiments described below are for the exemplary purpose only, without covering all embodiments of the present invention. Those skilled in the art can derive other embodiments from the embodiments given herein without making any creative effort, and all such embodiments are covered in the protection scope of the present invention.

In an embodiment, the present invention provides a method, a system and a server for implementing network security access control, which solve the security problem in the Intranet.

Figure 1:
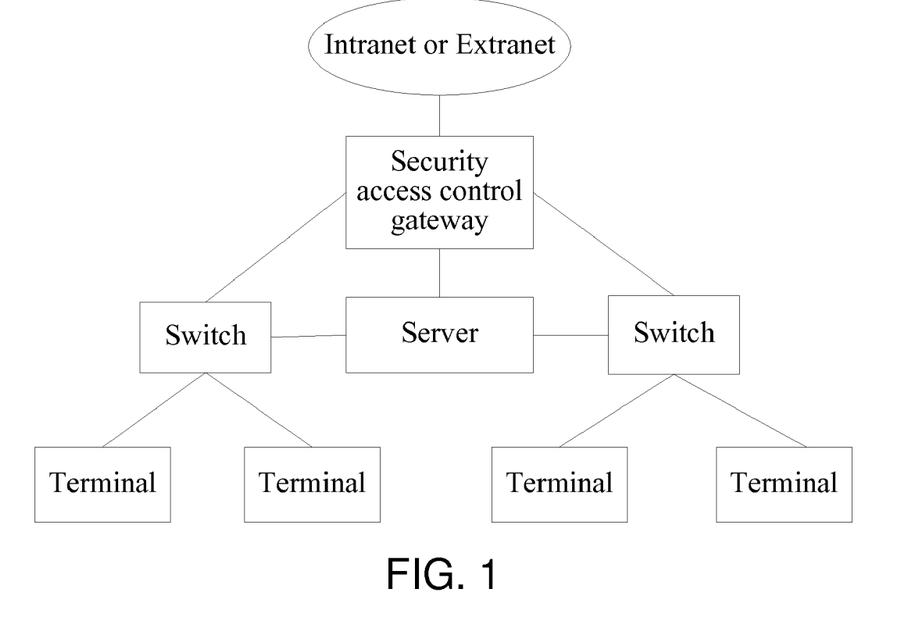
FIG. 1 shows a deployment structure of a system for implementing network security access control according to an embodiment of the present invention.

FIG. 1 shows a deployment structure of a system for implementing network security access control according to an embodiment of the present invention.

A security access control gateway is used as a gateway device for connecting a terminal to the Intranet or Extranet; at least one switch is connected to the security access control gateway; different terminals are connected to one of the switches; and security control software is installed on the terminals. A server is connected to the security access control gateway and each of the switches; the terminal sends identity authentication information to the server through the switch; the server returns an authentication result to the switch and the security access control gateway, and returns a security policy to a security control module on the terminal.

The server is used as a database that maintains identity information of valid users, and authenticates an access identity of each terminal user. The server pre-imports the identity information of all valid users to the database and saves the account and password of each user so as to check the validity of the account and password of a user when the user accesses the network, and to further check the information that can uniquely represent the identity of a user or a terminal if necessary, such as the Media Access Control (MAC) address information, the account information of a user on a domain server to be logged into, or the account information of a user on a lightweight directory access protocol server to be logged into, so as to determine whether to permit the terminal to access the specified network.

The switch supports the 802.1x protocol, and the 802.1x protocol controls the opening or closing of ports of the switch and isolates the unauthorized terminal from accessing the network in an access layer. In addition, the 802.1x protocol controls the switch to isolate the mutual access among the terminals connected to the ports of the switch, and therefore effectively controls the transmission of files or other data among the terminals and avoids the spreading of viruses among the terminals.

The security access control gateway limits access of the terminal to network resources to the specified IP segment according to the level of the network access right of a terminal user authenticated by the server.

Security control software is installed on the terminal. The security control software performs operations, including: monitoring the operation of the terminal, monitoring the ports by using which the terminal accesses the network, permitting or forbidding the terminal to install or run the software specified by an administrator, checking and modifying the patch installation of a terminal system, and monitoring and forbidding the terminal running some certain processes according to the security policy delivered by the server. In general, the security software monitors the operation of the terminal according to the security policy delivered by the server, checks and solves the security problems of the terminal, monitors and forbids the operation that violates the security policy on the terminal.

It should be noted that the Intranet refers to the internal network which a terminal accesses, and the Extranet refers to the Internet which a terminal accesses, or a server to be connected through the Internet.

The method, system and server for implementing network security access control of the present invention are described in the following with reference to the accompanying drawings.

Figure 2:
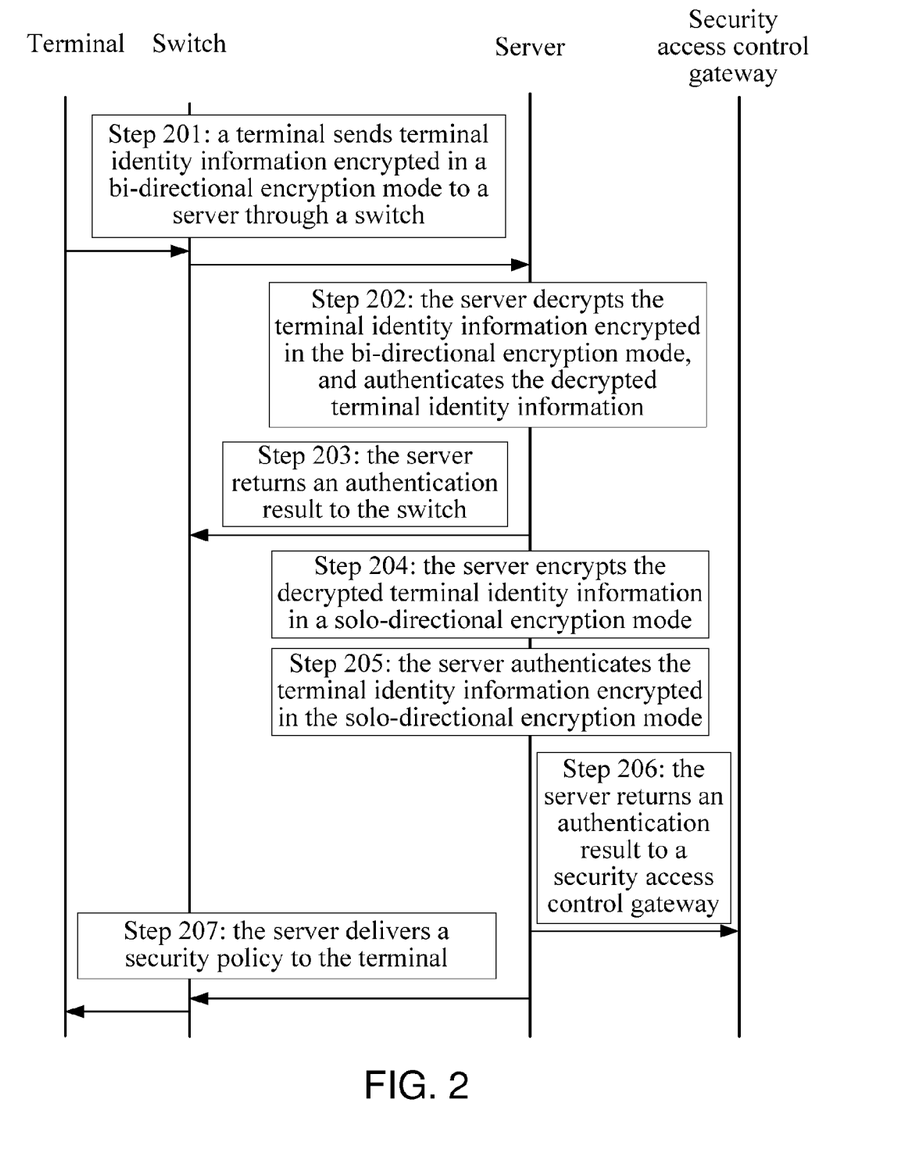
FIG. 2 is a flow chart of a method for implementing network security access control according to an embodiment of the present invention.

FIG. 2 is a flow chart of a method for implementing network security access control according to an embodiment of the present invention.

In this embodiment, firstly, a terminal initiates authentication to a server, and then the server authenticates user name and password information of the terminal to determine whether to authenticate an access right to the terminal, whether to authenticate the access level of the terminal user to the network, and whether to provide the security policy to be delivered to the terminal. After the authentication is passed, a switch that supports the 802.1x protocol enables or disables the network access right of the terminal according to an authentication result returned by the server; a security access control device opens the network resources of a specified IP address segment to the terminal according to the level of the network access right of the terminal returned by the server; security control software on the terminal monitors the operation of the terminal, monitors the ports by using which the terminal accesses the network, permits or forbids the terminal to install or run the software specified by an administrator, checks and modifies the patch installation of a terminal system, monitors and forbids some certain processes running on the terminal according to the security policy delivered by the server. The specific steps are as follows:

Step 201: A terminal sends terminal identity information encrypted in a bi-directional encryption mode to a server through a switch.

The terminal is connected to the switch, and the encrypted terminal identity information sent by the terminal is sent to the server through the switch. The bi-directional encryption is bi-directional encryption supported by the switch, and the encryption mode may be Data Encryption Standard (DES), 3DES, or Advanced Encryption Standard (AES). After receiving the encrypted terminal identity information forwarded by the switch, the server performs step 202.

Step 202: The server decrypts the terminal identity information encrypted in the bi-directional encryption mode, and authenticates the decrypted terminal identity information.

The server comprises a database that maintains identity information of valid users, and authenticates the access identity of each terminal user. The server pre-imports identity information of all valid users to the database, saves the account and password of each user, and checks the validity of the account and password of a user when the user accesses the network. Corresponding to each user, the network access right of the user, the level of the network access right, and the corresponding security policy to be monitored are also set up on the server. After determining that the user name and password of the terminal are correct, the server returns the network access right of the user, the level of the network access right and the needed security policy according to the user name.

Step 203: The server returns an authentication result to the switch, and the switch opens or closes the port by using which the terminal accesses the network, according to the returned authentication result.

The authentication result returned to the switch by the server includes the network access right of the user, including: if the returned authentication result indicates that the terminal has the network access right, the switch opens the port by using which the terminal accesses the network; if the returned authentication result indicates that the terminal does not have the network access right, the switch closes the port by using which the terminal accesses the network. The port herein is the port that connects the terminal and the switch.

Step 204: The server encrypts the decrypted terminal identity information in a solo-directional encryption mode.

The solo-directional encryption is unidirectional encryption, which specifically may be Message-Digest Algorithm 5 (MD5), or Secure Hash Algorithm 1 (SHA1).

Step 205: The server authenticates the terminal identity information encrypted in the solo-directional encryption mode.

The server is a database that maintains identity information of valid users, and authenticates the access identity of a terminal user. The server pre-imports identity information of all valid users to the database, saves the account and password of each user, and checks the validity of the account and password of a user when the user accesses the network. Corresponding to each user, the network access right of the user, the level of the network access right of the user to the network, and the corresponding security policy to be monitored are also set on the server. After determining that the user name and password of the terminal are correct, the server returns the network access right of the user, the level of the network access right and the needed security policy according to the user name.

Step 206: The server returns an authentication result to a security access control gateway, and the security access control gateway controls access of the terminal to network resources according to the authentication result.

The authentication result returned by the server to the security access control gateway includes the level of the network access right of the terminal.

The security access control gateway controls access of the terminal to network resources according to the authentication result, including: the security access control gateway opens the network resources of the accessed specified IP address segment to the terminal through the switch according to the level of the network access right of the terminal. The level of the network access right includes: enabling all the access rights for the terminal, enabling the access right of a part of IP addresses for the terminal, or enabling the access right of one or several IP addresses for the terminal.

Step 207: The server delivers a security policy to the terminal.

The security policy delivered by the server to the terminal includes: monitoring a port by using which the terminal accesses the network, monitoring processes running on the terminal and checking whether illegal software is installed on the terminal.

The security control software installed on the terminal monitors the terminal according to the security policy, including: monitoring a port by using which the terminal accesses the network, monitoring processes running on the terminal, and checking whether illegal software is installed on the terminal.

As described above, the present invention provides a method for implementing security access control, in which a switch that supports the 802.1X protocol opens or closes the access right of a terminal according to an authentication result of the terminal identity information, a security access control gateway performs specific control over access of the terminal to network resources according to the authentication result of the terminal identity information, and security control software installed on the terminal specifically carries out a security policy delivered by a server to monitor the terminal. Through the cooperation of the switch, the security access control gateway and the security control software, the present invention achieves the precise control over the network access of the terminal and ensures the security of the network content. Specifically, the security access control gateway and the switch that supports the 802.1X control the specific Intranet resources accessed by the terminal, and therefore effectively control access of an invalid user to the Intranet resources. Meanwhile, the security access control gateway and the switch restrict the level of the access right of the terminal users, and therefore further ensure the security of the Intranet resources. Further, the control over the access right of the terminal to the Extranet is also achieved, so as to effectively prevent the information leakage of the internal terminal and strengthen the network security. In addition, the security control software running on the terminal monitors the terminal according to the security policy delivered by the server, and detects exceptions of the terminal in time, and therefore further ensures the security of the deployment network.

An embodiment of the structure of a server for implementing the above method is provided below.

Figure 3:
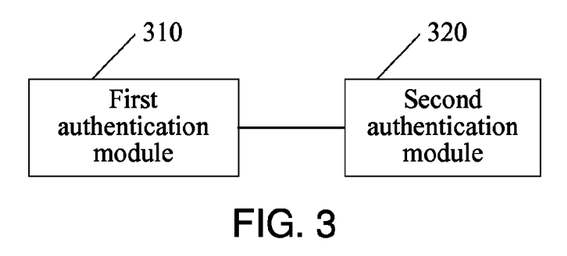
FIG. 3 is a structural view of a server according to an embodiment of the present invention.

FIG. 3 is a structural view of a server according to an embodiment of the present invention.

A server is provided, which includes a first authentication module 310 and a second authentication module 320.

The first authentication module 310 is configured to receive terminal identity information that is encrypted in a bi-directional encryption mode and forwarded by a switch; decrypt the terminal identity information encrypted in the bi-directional encryption mode and authenticate the decrypted terminal identity information; return an authentication result to the switch, so that the switch controls access of a terminal to a network according to the authentication result.

The second authentication module 320 is configured to encrypt the terminal identity information decrypted by the first authentication module in a solo-directional encryption mode; authenticate the terminal identity information encrypted in the solo-directional encryption mode; return an authentication result to a security access control gateway, so that the security access control gateway controls access of the terminal to network resources according to the authentication result; deliver a security policy to a security control module on the terminal so that the security control module on the terminal monitors the terminal according to the security policy.

Further, the authentication result returned by the first authentication module 310 to the switch indicates: the terminal has the network access right, or the terminal does not have the network access right.

Further, the authentication result returned by the second authentication module 320 to the security access control gateway includes the level of the network access right of the terminal.

Further, the security policy delivered by the second authentication module 320 to the security control module on the terminal includes: monitoring a port by using which the terminal accesses the network, monitoring processes running on the terminal and checking whether illegal software is installed on the terminal.

Figure 4:
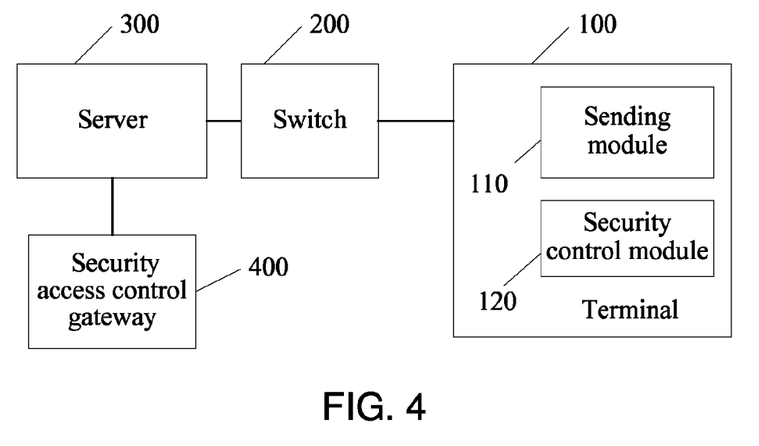
FIG. 4 is a schematic diagram of a system for implementing network security access control according to an embodiment of the present invention.

In an embodiment, the present invention further provides a system for implementing network security access control. FIG. 4 is a schematic diagram of a system for implementing network security access control according to an embodiment of the present invention.

A system for implementing network security access control is provided, which includes a server 300, a switch 200, a security access control gateway 400 and a terminal 100.

The terminal 100 includes a sending module 110 and a security control module 120.

The sending module 110 is configured to send terminal identity information encrypted in a bi-directional encryption mode to the switch 200.

The security control module 120 is configured to receive a security policy delivered by the server 300, and monitor the terminal according to the security policy.

The security policy delivered by the server 300 to the security control module 120 on the terminal 110 includes: monitoring a port by using which the terminal accesses the network, monitoring processes running on the terminal and checking whether illegal software is installed on the terminal.

The security control module 120 monitors the terminal 100 according to the security policy, including: monitoring the port by using which the terminal accesses the network, monitoring the processes running on the terminal, and checking whether illegal software is installed on the terminal.

The switch 200 is configured to forward terminal identity information encrypted in a bi-directional encryption mode sent by the terminal 100 to the server 300, receive an authentication result returned by the server 300, and control the network access of the terminal 100 according to the authentication result.

The authentication result returned to the switch 200 by the server 300 includes the access right of the user, including: if the returned authentication result is that the terminal has the network access right, the switch 200 opens the port by using which the terminal accesses the network; if the returned authentication result is that the terminal does not have the network access right, the switch 200 closes the port by using which the terminal accesses the network. The port herein is the port that connects the terminal 100 and the switch 200.

The server 300 is configured to receive terminal identity information that is encrypted in the bi-directional encryption mode and forwarded by the switch 200; decrypt the terminal identity information encrypted in the bi-directional encryption mode and authenticate the decrypted terminal identity information; return an authentication result to the switch 200; encrypt the decrypted terminal identity information in a solo-directional encryption mode; authenticate the terminal identity information encrypted in the solo-directional encryption mode; return an authentication result to the security access control gateway 400; and deliver a security policy to the security control module 120 on the terminal 100.

The security access control gateway 400 is configured to receive the authentication result returned by the server 300 and control access of the terminal 100 to network resources according to the authentication result.

The authentication result returned by the server to the security access control gateway includes the level of the network access right of the terminal.

The security access control gateway 400 controls access of the terminal to network resources according to the authentication result, including: the security access control gateway 400 opens the network resources of the accessed specified IP address segment to the terminal 100 through the switch 200 according to the level of the network access right of the terminal. The level of the network access right to the network includes: enabling all the access right for the terminal 100, enabling the access right of a part of IP addresses for the terminal 100, or enabling the access right of one or several IP addresses for the terminal 100.

The present invention provides a system for implementing security access control, in which a switch 200 that supports the 802.1X protocol enables or disables the access right of a terminal 100 according to an authentication result of terminal identity information, a security access control gateway 400 performs the specific control over access of the terminal to network resources according to the authentication result of the terminal identity information, and a security control module 120 on the terminal 100 specifically carries out a security policy delivered by a server 300 to monitor the terminal 100. Through the cooperation of the switch 200, the security access control gateway 400 and the security control module 120 on the terminal 100, the present invention achieves the precise control over the network access of the terminal and ensures the security of the network content. Specifically, the security access control gateway 400 and the switch 200 that supports the 802.1X control the specific Intranet resources accessed by the terminal, and therefore effectively control access of an invalid user to Intranet resources. Meanwhile, the security access control gateway 400 and the switch 200 restrict the access right level of a terminal user, and therefore further ensure the security of the Intranet resources. Further, the control over the access right of the terminal to the Extranet is achieved, so as to effectively prevent the information leakage of the internal terminal and strengthen the network security. In addition, the security control module 120 on the terminal 100 monitors the terminal 100 according to the security policy delivered by the server 300, and detects exceptions of the terminal 100 in time, and therefore further ensures the security of the deployment network.

In the system for implementing network security access control, a plurality of terminals may be involved and simultaneously connected to the security access control gateway through the switch and the server. In this embodiment, the network security access control of one terminal is taken as an example to illustrate the system for implementing network security access control, and the system is also applicable to the network security access control of other terminals in the network.

Persons of ordinary skill in the art may understand that all or part of the steps of the method according to the embodiments of the present invention may be implemented by a program instructing relevant hardware. The program may be stored in a computer readable storage medium. When the program runs, the steps of the embodiments of the above methods may be included. The storage medium may be a magnetic disk, a Compact Disk Read-Only Memory (CD-ROM), a Read-Only Memory (ROM) or a Random Access Memory (RAM).

The above detailed descriptions illustrate a method, system and server for implementing network security access control according to the present invention. Persons of ordinary skill in the art can make variations and modifications to the present invention in terms of the specific implementations and application scopes according to the ideas of the present invention. Therefore, the specification shall not be construed as limitations to the present invention.

The invention claimed is:

1. A method for implementing network security access control, comprising:
    receiving terminal identity information that is encrypted in a bi-directional encryption mode and forwarded by a switch;
    decrypting the terminal identity information encrypted in the bi-directional encryption mode, and authenticating the decrypted terminal identity information;
    returning an authentication result to the switch, so that the switch controls access of a terminal to a network according to the authentication result;
    encrypting the decrypted terminal identity information in a solo-directional encryption mode;
    authenticating the terminal identity information encrypted in the solo-directional encryption mode;
    returning an authentication result to a security access control gateway, so that the security access control gateway controls access of the terminal to network resources according to the authentication result; and
    delivering a security policy to a security control module on the terminal, so that the security control module monitors the terminal according to the security policy;
    wherein the security policy delivered to the security control module on the terminal comprises:
    delivering the security policy of monitoring a port by using which the terminal accesses the network to the security control module on the terminal, monitoring a process running on the terminal, and checking whether illegal software is installed on the terminal, so as to monitor the port by using which the terminal accesses the network, monitor the processes running on the terminal and check whether the illegal software is installed on the terminal according to the security policy.

2. The method for implementing network security access control according to claim 1, wherein the returning the authentication result to the switch comprises one of the following steps:
    returning the authentication result indicating that the terminal has a network access right to the switch so that the switch opens a port by using which the terminal accesses the network; and
    returning the authentication result indicating that the terminal does not have a network access right to the switch so that the switch closes a port by using which the terminal accesses the network.

3. The method for implementing network security access control according to claim 1, wherein the authentication result returned to the security access control gateway comprises a level of a network access right of the terminal so that the security access control gateway opens network resources of an specified IP address segment.

4. The method for implementing network security access control according to claim 1, wherein the bi-directional encryption comprises Data Encryption Standard (DES), 3DES or Advanced Encryption Standard (AES); and
    the solo-directional encryption comprises Message-Digest Algorithm 5 (MD5), or Secure Hash Algorithm 1 (SHA1).

5. A server comprising nontransitory computer readable media, the nontransitory computer readable media comprising:
    a first authentication module, to receive terminal identity information that is encrypted in a bi-directional encryption mode and forwarded by a switch;
    decrypt the terminal identity information encrypted in the bi-directional encryption mode and authenticate the decrypted terminal identity information; return an authentication result to the switch, so that the switch controls access of a terminal to a network according to the authentication result; and
    a second authentication module, to encrypt the terminal identity information decrypted by the first authentication module in a solo-directional encryption mode; authenticate the terminal identity information encrypted in the solo-directional encryption mode; return an authentication result to a security access control gateway, so that the security access control gateway controls access of the terminal to network resources according to the authentication result; deliver a security policy to a security control module on the terminal, so that the security control module on the terminal monitors the terminal according to the security policy;
    wherein the security policy delivered by the second authentication module to the security control module on the terminal comprises:
    the security control module to: monitor a port by using which the terminal accesses the network, monitor processes running on the terminal and check whether illegal software is installed on the terminal.

6. The server according to claim 5, wherein the authentication result returned by the first authentication module to the switch indicates: the terminal has a network access right or the terminal does not have a network access right.

7. The server according to claim 5, wherein the authentication result returned by the second authentication module to the security access control gateway comprises a level of the network access right of the terminal.

8. A system for implementing network security access control, comprising: a server, a switch, a security access control gateway and a terminal, wherein the terminal comprises a sending module and a security control module, the sending module is to send terminal identity information encrypted in a bi-directional encryption mode to the switch;

the security control module is configured to receive a security policy delivered by the server and monitor the terminal according to the security policy;

the server is to receive the terminal identity information that is encrypted in the bi-directional encryption mode and forwarded by the switch; decrypt the terminal identity information encrypted in the bi-directional encryption mode and authenticate the decrypted terminal identity information; return an authentication result to the switch; encrypt the decrypted terminal identity information in a solo-directional encryption mode; authenticate the terminal identity information encrypted in the solo-directional encryption mode; return an authentication result to the security access control gateway; and deliver a security policy to the security control module on the terminal;

the switch is to forward the terminal identity information that is encrypted in the bi-directional encryption mode and sent by the terminal, to the server, receive the authentication result returned by the server, and control network access of the terminal according to the authentication result; and the security access control gateway is to receive the authentication result returned by the server and control access of the terminal to network resources according to the authentication result wherein the security policy delivered by the server to the security control module on the terminal comprises:

the security control module to: monitor a port by using which the terminal accesses the network, monitor processes running on the terminal and check whether illegal software is installed on the terminal.

\* \* \* \* \*